UNITED STATES PATENT OFFICE.

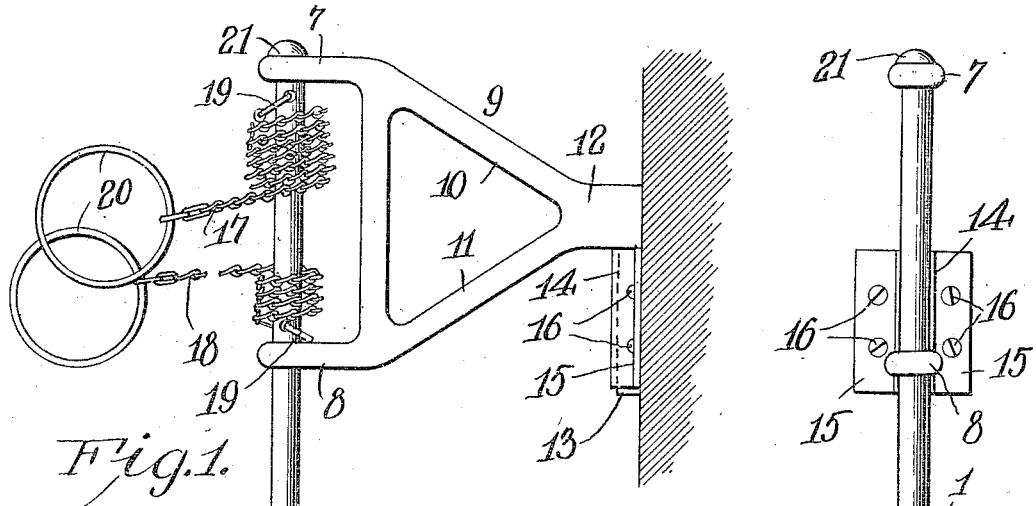

JOHN W. HORNER AND GEORGE L. PATTERSON, OF REVERE, MASSACHUSETTS.

EGG-BEATER.

959,536.    Specification of Letters Patent.    Patented May 31, 1910.

Application filed May 2, 1908. Serial No. 430,580.

*To all whom it may concern:*

Be it known that we, JOHN W. HORNER and GEORGE L. PATTERSON, citizens of the United States, residing at Revere, in the county of Suffolk and State of Massachusetts, have invented new and useful Improvements in Egg-Beaters, of which the following is a specification.

This invention relates to egg beaters, the object of the invention being to produce an article of the kind referred to of simple and economical construction and which is reliable and effective in operation, easy to clean, and which may be put into operation instantly and which has the distinct advantage of being thoroughly supported and braced to withstand any reasonable strain applied thereto in the usual operation.

With the above and other objects in view, the invention consists in the novel construction, combination and arrangement of parts herein fully described, illustrated and claimed.

In the accompanying drawings:—Figure 1 is a side elevation of the egg beater of this invention. Fig. 2 is a front elevation thereof omitting the flexible drivers. Fig. 3 is a plan view thereof. Fig. 4 is a detail plan view of the socket piece.

The device comprises essentially a vertically disposed spindle 1 upon the lower end of which is mounted a beater frame comprising a bottom cross bar 2 which is outwardly bowed or convex curvilinear, oppositely arranged side bars 3 which are also curvilinear and bowed inwardly, and a top cross bar 4 the central portion of which is offset upwardly as shown at 5 and connected to the spindle 1. Within the beater frame thus constructed there is arranged a plurality of horizontally disposed beater blades 6 secured rigidly upon the spindle 1. The beater thus formed is adapted to be lowered into a vessel containing the eggs to be beaten. The upper portion of the spindle is journaled in the vertically spaced upper and lower arms 7 and 8 respectively, a supporting bracket 9 having a general triangular shape as shown in Fig. 1 and disposed edgewise vertically, the body portion of the bracket comprising inwardly converging bars 10 and 11 which merge into a head 12 from which depends a shank 13 which is removably fitted into a socket piece 14 formed of sheet metal and bent into the shape illustrated in Fig. 2 to provide attaching flanges 15 by which the socket piece is adapted to be secured to a wall, partition or other vertical support by means of screws 16 or their equivalent.

The construction just described provides for readily detaching the bracket 9 by sliding the shank 13 upward out of engagement with the socket piece.

Rotary motion is imparted to the spindle 1 by means of a pair of flexible drivers 17 and 18 which are shown in the form of chains wound in opposite directions around the spindle between the bearing arms 7 and 8 of the bracket. Each driver or chain is connected to the spindle 1 by means of a ring 19 which is conveniently inserted through a hole in the spindle. The ring 19 of the upper flexible driving element 17 forms a stop and serves to limit the upward movement of the spindle 1 by coming in contact with the upper arm 7 of the bracket. To the outer end of each driver or chain there is attached a handle 20 shown for convenience in the form of a ring or loop. Above the upper bearing arm 7, the spindle is provided with an enlarged head 21 which bears against the arm 7 to uphold the spindle.

From the foregoing description it will be understood that the egg beater may be readily attached to and detached from the socket piece 14 which provides a rigid support for the operating mechanism of the beater and renders it possible to manipulate the beater with considerable dexterity without liability of breakage and as a result of such arrangement, the time required to beat the eggs is materially reduced as compared to the ordinary egg beaters which are held in one hand and operated by the other hand. It will be understood that the handles 20 are simultaneously moved in opposite directions on account of the fact that as one flexible driver is pulled outward and unwound from the spindle 1, the other flexible driver is simultaneously wound thereon. The manner of detaching the beater also facilitates the placing of the beater in the vessel containing the eggs and also the removal of the beater therefrom. Furthermore, by reason of the arrangement described, the beater is susceptible of being quickly, thoroughly and easily cleaned.

We claim:—

As an article of manufacture, a device of the class described comprising a socket member adapted to be attached fixedly to a vertical support such as a wall, a bracket member provided with a shank removably fitted in the socket member and having vertically spaced horizontally projecting bearing arms, a vertical spindle journaled in said bearing arms and provided at its upper extremity with a head resting on the upper bracket arm, a beater fast on said spindle below the lower bracket arm, flexible driving elements connected to and wrapped around said spindle in opposite directions between the spaced bearing arms, attaching rings connecting said flexible driving elements to the spindle, one of said rings passing through the spindle beneath the upper bracket arm and serving as a stop to limit the upward movement of the spindle, and handles in the form of loops at the free ends of said flexible driving elements.

In testimony whereof we affix our signatures in presence of two witnesses.

JOHN W. HORNER.
GEORGE L. PATTERSON.

Witnesses:
IRWIN L. VAN VORST,
GERTRUDE K. HORNER.